US010645025B2

(12) United States Patent
Medovich et al.

(10) Patent No.: US 10,645,025 B2
(45) Date of Patent: May 5, 2020

(54) OBJECT MEMORY MANAGEMENT UNIT

(71) Applicant: ColorTokens, Inc., Santa Clara, CA (US)

(72) Inventors: Mark Medovich, Fort Myers, FL (US); Rajesh Parekh, Los Altos, CA (US); Bharat Sastri, Pleasanton, CA (US)

(73) Assignee: COLORTOKENS, INC. CA (US)

( * ) Notice: Subject to any disclaimer, the term of this patent is extended or adjusted under 35 U.S.C. 154(b) by 106 days.

(21) Appl. No.: 15/177,567

(22) Filed: Jun. 9, 2016

(65) Prior Publication Data
US 2016/0315874 A1 Oct. 27, 2016

Related U.S. Application Data

(63) Continuation of application No. 15/134,053, filed on Apr. 20, 2016.

(60) Provisional application No. 62/151,045, filed on Apr. 22, 2015.

(51) Int. Cl.
| | |
|---|---|
| *H04L 12/911* | (2013.01) |
| *G06F 12/10* | (2016.01) |
| *H04L 29/12* | (2006.01) |
| *G06F 12/02* | (2006.01) |
| *G06F 12/1027* | (2016.01) |
| *G06F 12/1009* | (2016.01) |

(52) U.S. Cl.
CPC ........ *H04L 47/781* (2013.01); *G06F 12/1009* (2013.01); *G06F 12/1027* (2013.01); *H04L 61/2503* (2013.01); *G06F 12/0246* (2013.01); *G06F 12/0284* (2013.01); *G06F 12/10* (2013.01); *G06F 2212/152* (2013.01); *G06F 2212/154* (2013.01); *H04L 61/6004* (2013.01)

(58) Field of Classification Search
CPC ........ G06F 2212/152; G06F 2212/154; G06F 12/1027; G06F 12/10; G06F 12/0246; G06F 12/0284; G06F 12/1009; H04L 47/781; H04L 61/2503; H04L 61/6004
See application file for complete search history.

(56) References Cited

U.S. PATENT DOCUMENTS

| | | | |
|---|---|---|---|
| 6,049,808 A * | 4/2000 | Talluri | G06F 12/0284 711/112 |
| 2003/0182363 A1 | 9/2003 | Clough et al. | |
| 2009/0089537 A1 | 4/2009 | Vick et al. | |
| 2010/0077066 A1* | 3/2010 | Chawla | G06F 9/4416 709/222 |
| 2011/0072204 A1* | 3/2011 | Chang | G06F 12/0284 711/103 |

(Continued)

*Primary Examiner* — Masud K Khan
(74) *Attorney, Agent, or Firm* — Barry Choobin; Patent 360 LLC

(57) ABSTRACT

Techniques to facilitate enhanced addressing of local and network resources from a computing system are provided herein. In one implementation, a method of operating an object-based memory management unit on a computing system to unify addressing of local and network resources includes maintaining a mapping of virtual addresses to local addresses and network addresses, and identifying resource requests that use the virtual addresses. The method further provides handling the resource requests per the mapping, and wherein a given request of the resource requests implicates a network resource, accessing the network resource associated with the given request over at least the network.

11 Claims, 10 Drawing Sheets

(56) References Cited

U.S. PATENT DOCUMENTS

| | | | |
|---|---|---|---|
| 2012/0239731 A1* | 9/2012 | Shyamsunder | G06F 17/30876 709/203 |
| 2012/0297158 A1 | 11/2012 | Hua et al. | |
| 2013/0205139 A1 | 8/2013 | Walrath | |
| 2013/0332700 A1 | 12/2013 | Kopylovitz et al. | |
| 2015/0089022 A1* | 3/2015 | Husain | H04L 67/1095 709/219 |
| 2015/0186260 A1 | 7/2015 | Camp et al. | |
| 2016/0041928 A1* | 2/2016 | Lesartre | G06F 12/0246 711/163 |
| 2016/0077975 A1* | 3/2016 | Stabrawa | G06F 3/0604 711/209 |

* cited by examiner

OBJECT MEMORY MANAGEMENT UNIT

RELATED APPLICATIONS

This application is a continuation of U.S. patent application Ser. No. 15/134,053, entitled "OBJECT MEMORY MANAGEMENT UNIT" filed Apr. 20, 2016, which claims the benefit of, and priority to, U.S. Provisional Patent Application No. 62/151,045, entitled "OBJECT MEMORY MANAGEMENT UNIT", filed Apr. 22, 2015, which are hereby incorporated by reference in its entirety for all purposes.

TECHNICAL FIELD

Aspects of the disclosure are related to computing hardware and software technology, and in particular to computer architecture, cloud computing, and virtualization technology.

TECHNICAL BACKGROUND

Today, computing is increasingly being delivered as a utility service over the Internet. Through the deployment of cloud computing and virtualization technology, compute, storage, and application services are available for on-demand consumption over the Internet. In this model of delivery, a user is not required to have knowledge of the physical locations and the configurations of the compute and storage resources in order to utilize the service.

End users of cloud computing often organize the resources available into "hybrid clouds" that comprise "private clouds" that include servers and storage systems at a private data center, and also "public clouds" that include servers and storage systems located at multi-tenant public data centers such as Amazon Web Services®, Google Compute Engine®, or Microsoft Azure®. These clouds use virtualization technology such as those offered by VMWare ESX® or KVM to group computing resources for easy management. End users may also create cloud groups based on workload requirements for various end-user groups.

The existing methodology to create these groups requires manual assignment, typically by a cloud service provider, of the necessary compute, storage, network, and Internet resources. In fact, to enable easy consumption of services and resources by the compute node, the complexity of deploying and configuring the network topology and the available compute, storage, and network resources is typically handled b the cloud service provider. The sheer number of network devices and tools make it very onerous and inefficient for systems administrators at the service provider to deploy cloud resources that can deliver a level of performance that is guaranteed via a contractual obligation.

The fundamental reason for this problem results from the fact that the basic monolithic building block needed to build the cloud is a "motherboard". In its most basic implementation, this "motherboard" is typically comprised of a CPU, memory, and a network interface controller (NIC) connected together on a circuit board. Each "motherboard" on a network may be identified by a physical or virtual internet protocol (IP) address, or a physical media access control (MAC) address embedded in the NIC device. This "motherboard" may be implemented in a plurality of ways including but not limited to personal computer (PC) motherboards and blade server plug-in boards, multiples of which are required to build large servers as is common in the cloud. These "motherboards" are then used to deploy operating systems, which in turn allow the deployment of virtualization technology in the form of virtual machines (VMs) and virtual networks to create the end cloud product that supports guest operating systems, thereby enabling the consumption of computing resources as a service. In order to achieve this virtualization, the user that is creating the cloud resources typically needs to know the IP addresses of all of the computing, storage, and Internet resources needed to be connected together. Consequently, it is very problematic to create the cloud groups that provide the necessary resources to deliver the level of service required to handle the user workloads efficiently.

OVERVIEW

Provided herein are systems, methods, and software to enhance addressing of local and network resources for a computing system. In at least one implementation, a computing apparatus includes one or more computer readable media and a processing system operatively coupled with the one or more computer readable storage media. The computing apparatus further includes program instructions stored on the one or more computer readable storage media to implement an object-based memory management unit that, when read and executed by the processing system, direct the processing system to at least maintain a mapping of virtual addresses in the computing system to local addresses that address local resources of the computing system and network addresses that address network resources external to the computing system over at least a network. The program instructions further direct the processing system to receive resource requests that identify resources using the virtual addresses and, for at least a request of the resource requests that implicates a network resource, identify a network address for the network resource based on the mapping between the network address and a virtual address identified in the resource request. The program instructions also direct the processing system to access the network resource over at least the network using the network address.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
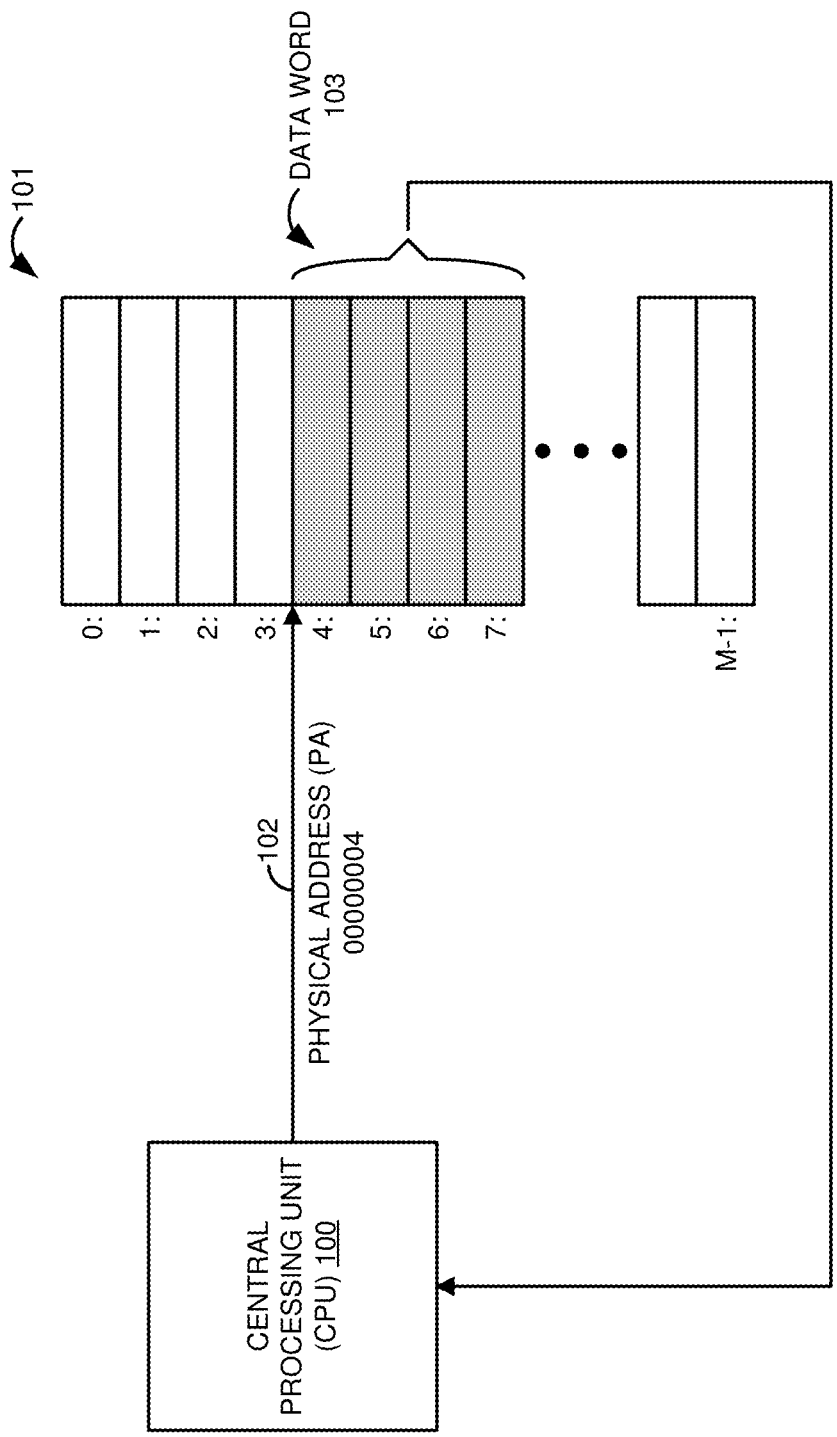
FIG. 1 is a block diagram that illustrates a system that uses physical addressing in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The following discussion presents techniques to federate or unify a plurality of physical and virtual compute, storage, and Internet resources and make them available as a local resource to any compute node. The techniques provide on-demand deployment and presentation of a compute resource that incorporates discrete physical and virtual compute, storage, and Internet resources available both locally or in the cloud as a unified local compute resource to a user.

In at least one implementation, a plurality of compute infrastructures may be deployed, dynamically federated from a plurality of available discrete physical and virtual compute, storage, and Internet resources, whether they are local or available in the cloud, as a single unified local resource to execute a plurality of workloads. This may be accomplished through the use of an object memory management unit (OMMU). In some implementations, the OMMU can provide a computer with the ability to map all of the authorized compute, storage, and Internet resources available to execute its workload, regardless of whether the resource is a physical resource such as a central processing unit (CPU implemented on a computer motherboard, or virtual such as a virtual machine (VM), local or in the cloud, into a single unified local physical resource that can execute a plurality of workloads. The OMMU may be implemented as a software program executing on a computer or a virtual machine to provide this memory mapping functionality for both a physical machine as well as a virtual machine. Further, the OMMU may also be implemented as a functional block in one or more silicon devices, including but not restricted to, commercial CPU devices such as those from companies like Intel, AMD, ARM, discrete Memory Management Unit VLSI, Motherboard VLSI chipsets, and other devices typically used to implement a computer motherboard.

The present disclosure describes a novel apparatus and method that enables the deployment and federation of compute, storage, and Internet resources regardless of where they might exist physically, and presents the federated resources as a single unified local resource under program code control. In at least one implementation, a federated cloud computing resource may be created on-demand that is controlled by a software program. The creation of this federated cloud computing resource involves the use of a "bootstrap" protocol such as, but not limited to, PXE (Pre-eXecution Environment as implemented by Intel Corporation) for the user's "motherboard," and the implementation of a resource and memory mapping apparatus called an Object Memory Management Unit (OMMU) in the firmware or the CPU silicon of the "motherboard" This OMMU apparatus and its operation will be described later in detail below.

Conventionally, a bootstrap protocol such as PXE allows a "motherboard" to boot-up under program control in a predetermined sequence. A sequence of program instructions identifies local resources available to the CPU such as memory, network interfaces, and other components available on the motherboard, initialize their state, and finally load and execute the operating system and all the necessary services such as TCP/IP internetworking to get the "motherboard" ready for use.

The present disclosure provides an enhanced bootstrap technique that utilizes the OMMU apparatus to create a virtual memory system that provides a virtual address to physical address translation that maps not only local motherboard devices as outlined above but also a plurality of network, Internet, or cloud (compute, storage, and other Internet) resources commonly referred to by those skilled in the art as universal resource identifiers (URIs). This enhanced bootstrap technique employing the OMMU results in an inventory of URI resources that appear as local resources, which in turn allows the "motherboard" to bootstrap with a much expanded capability by incorporating these network, Internet and cloud resources, referred to as universal resource identifiers (URIs), as a single unified local resource.

In addition to providing a mechanism to translate or map the local "motherboard" virtual address space to a local physical address space that incorporates main memory and disk storage as the media to define virtual storage, it expands the virtual address space to include a universal resource address space (URAS) into the virtual memory of the local system. In turn, the bootstrap code will also identify and deploy desired and authorized individual Internet resources, known as universal resource identifiers (URIs), and map them into the local system's physical address space. For example, in one embodiment, an inventory of pre-authorized URIs may be downloaded and cached in the system main memory, managed by the OMMU apparatus, and may be updated dynamically under program control.

The OMMU apparatus provides a mechanism to map or translate an expanded virtual address space that incorporates the universal resource address space to a local physical address space in a manner similar to that of a conventional memory management unit (MMU) implemented in CPU silicon. A PXE or similar bootstrap protocol in conjunction with the OMMU apparatus enables the federation and presentation of a plurality of compute, storage, network, and Internet resources (URIs) as a single unified local physical resource to the local system compute node as the end result of the boot process. The OMMU may use the universal address space as a trust repository, e.g. a cache of private keys that enable the encryption and decryption of URIs, object table entries in the OMMU, file read/write operations, and others.

In at least one exemplary embodiment, a plurality of systems implementations could comprise combinations of "motherboard" hardware running operating systems such as Microsoft Windows®, Linux®, OSX®, and the like, and network protocols such as hypertext transfer protocol (HTTP) using representational state transfer (ReST) protocols. Another exemplary embodiment could comprise a stand-alone computer program executing on a physical computer system or a virtual machine (VM) either locally, or on a remote computing system, or on a virtual machine in the cloud, or at both clients and servers simultaneously. In yet another embodiment, an individual user could utilize a computing system, either physical or virtual, comprising an OMMU to unify all of the user's resources and devices as a single local resource of the computing system, which could include local, on-premise resources, such as a local network attached storage (NAS) drive on a private, lower-layer cloud, in addition to compute, storage, and network resources (URIs) available to the user over Internet.

Figure 2:
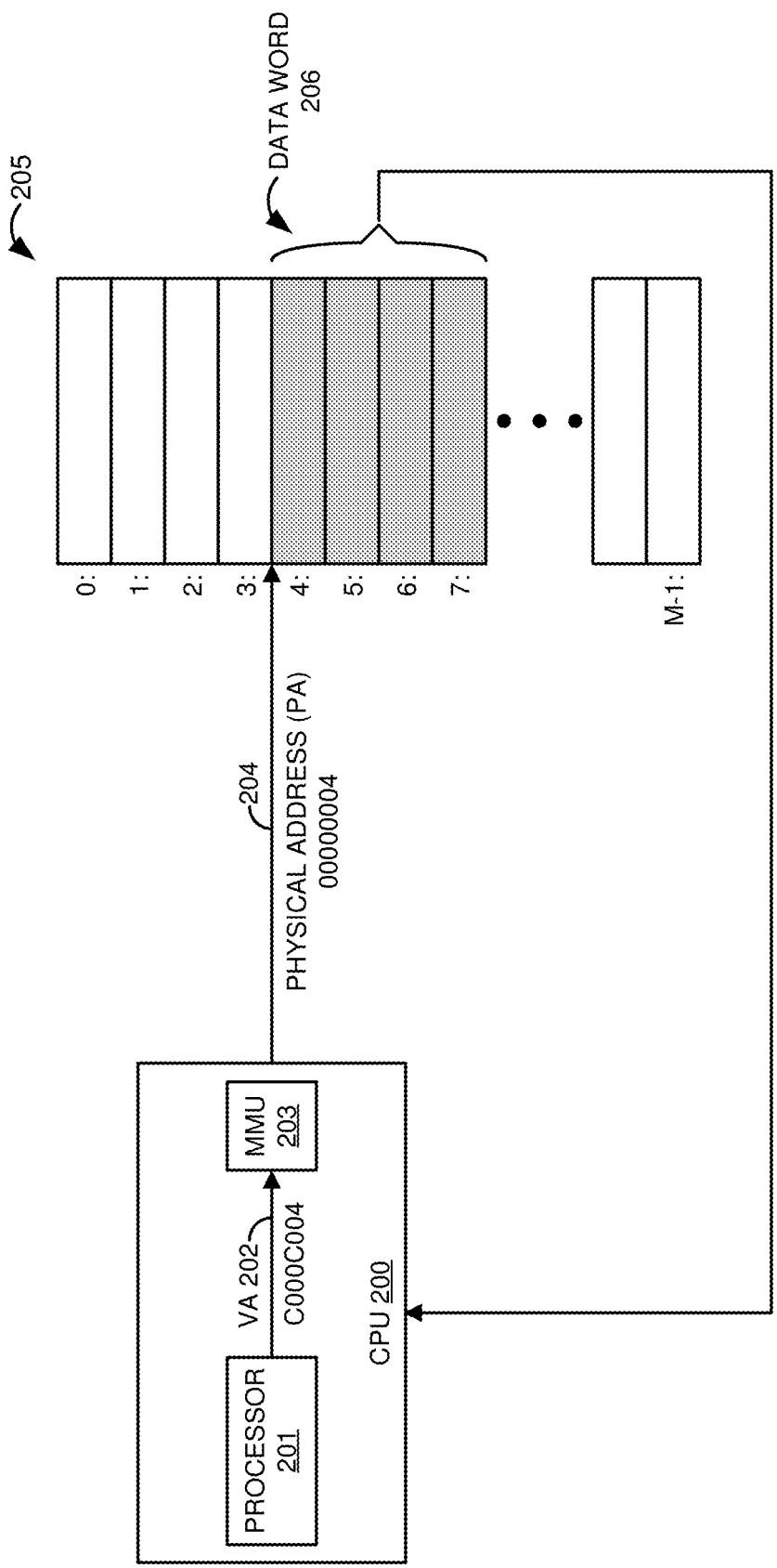
FIG. 2 is a block diagram that illustrates a system that uses virtual addressing in an exemplary implementation.
Figure 3:
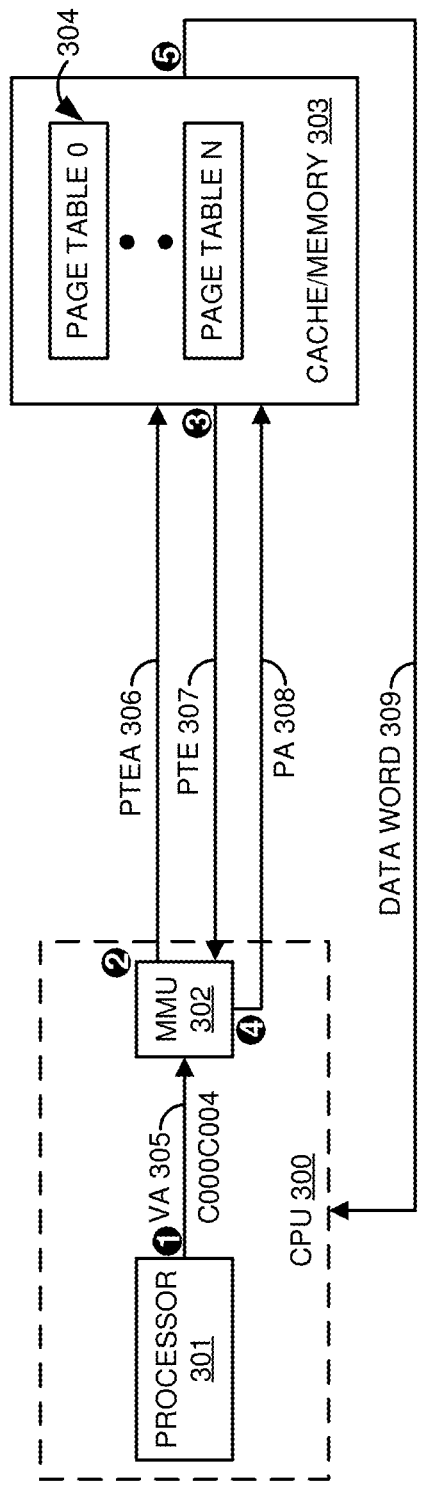
FIG. 3 is a block diagram that illustrates an operation of address translation from virtual address space to physical address space in an exemplary implementation.
Figure 4:
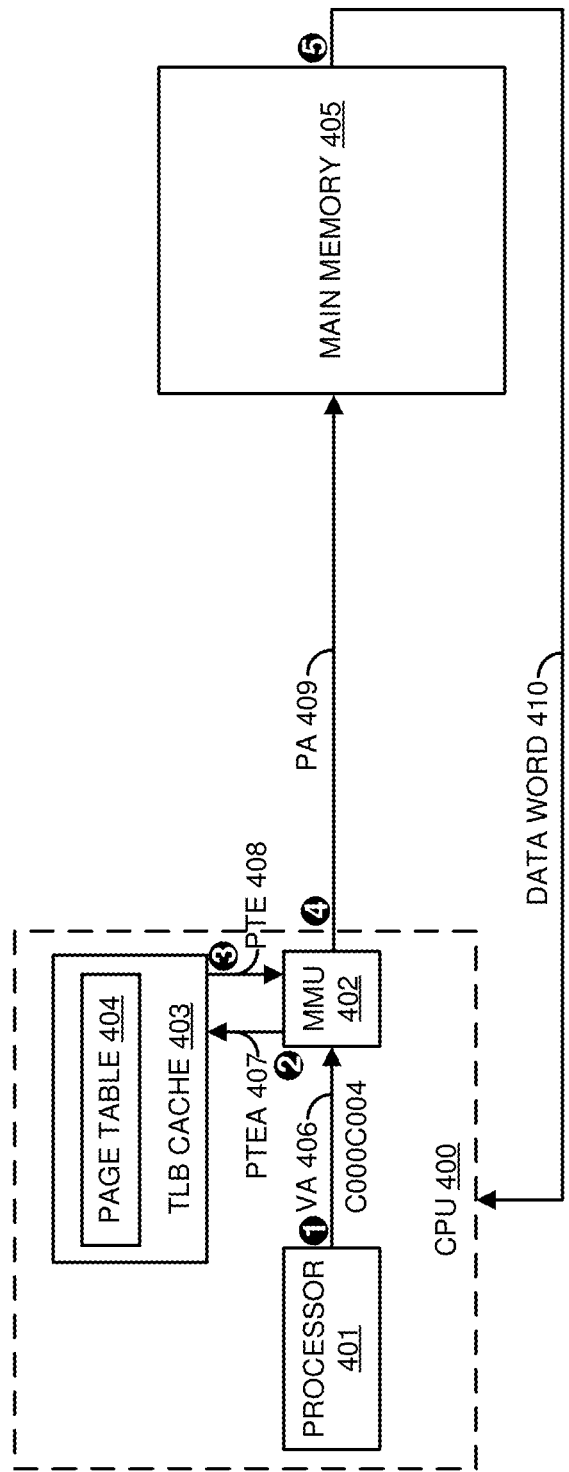
FIG. 4 is a block diagram that illustrates an operation of address translation from virtual address space to physical address space using an on-chip translation lookaside buffer cache in an exemplary implementation.
Figure 5:
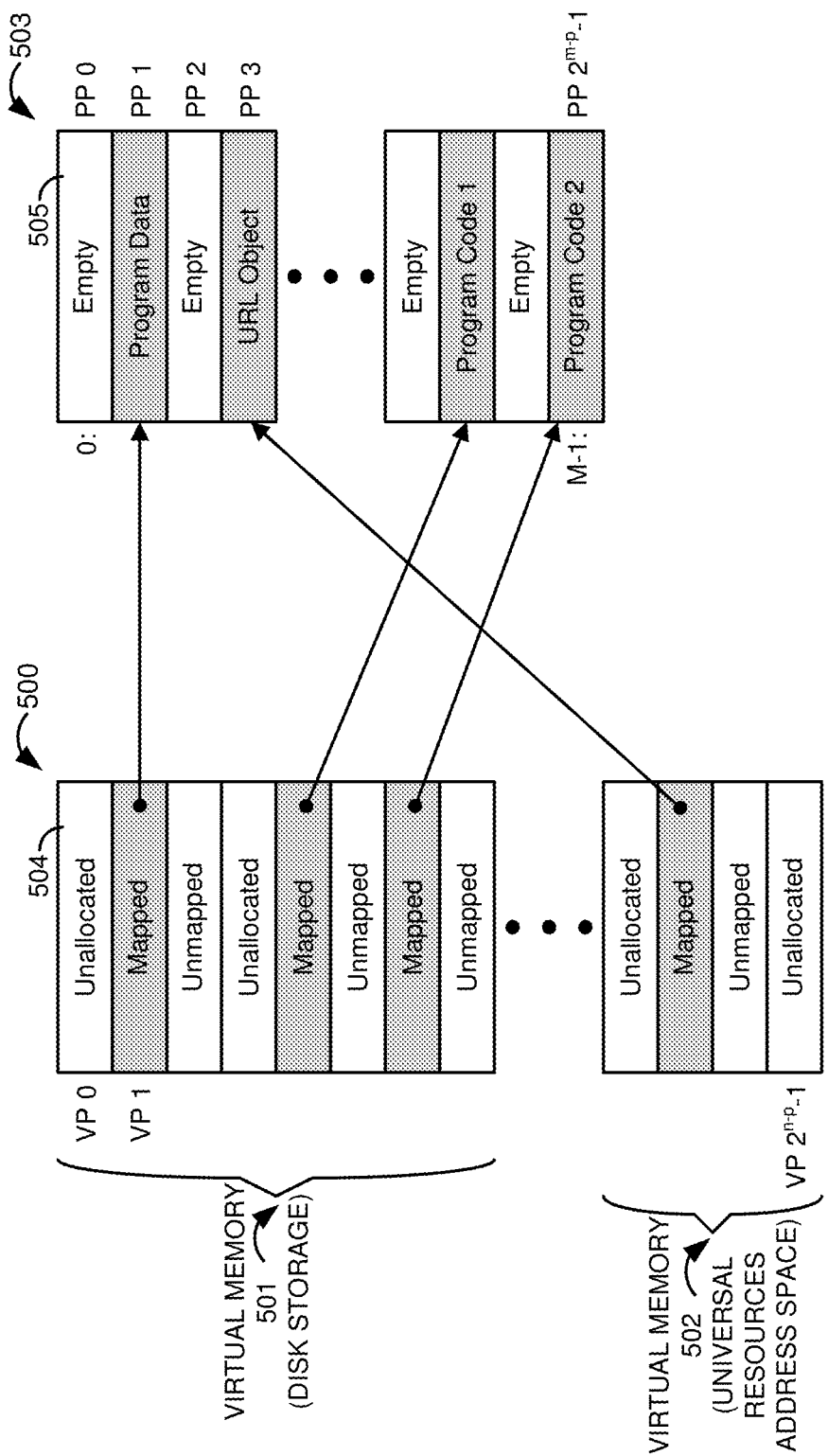
FIG. 5 is a block diagram that illustrates virtual memory mapped to physical memory in an exemplary implementation.
Figure 6:
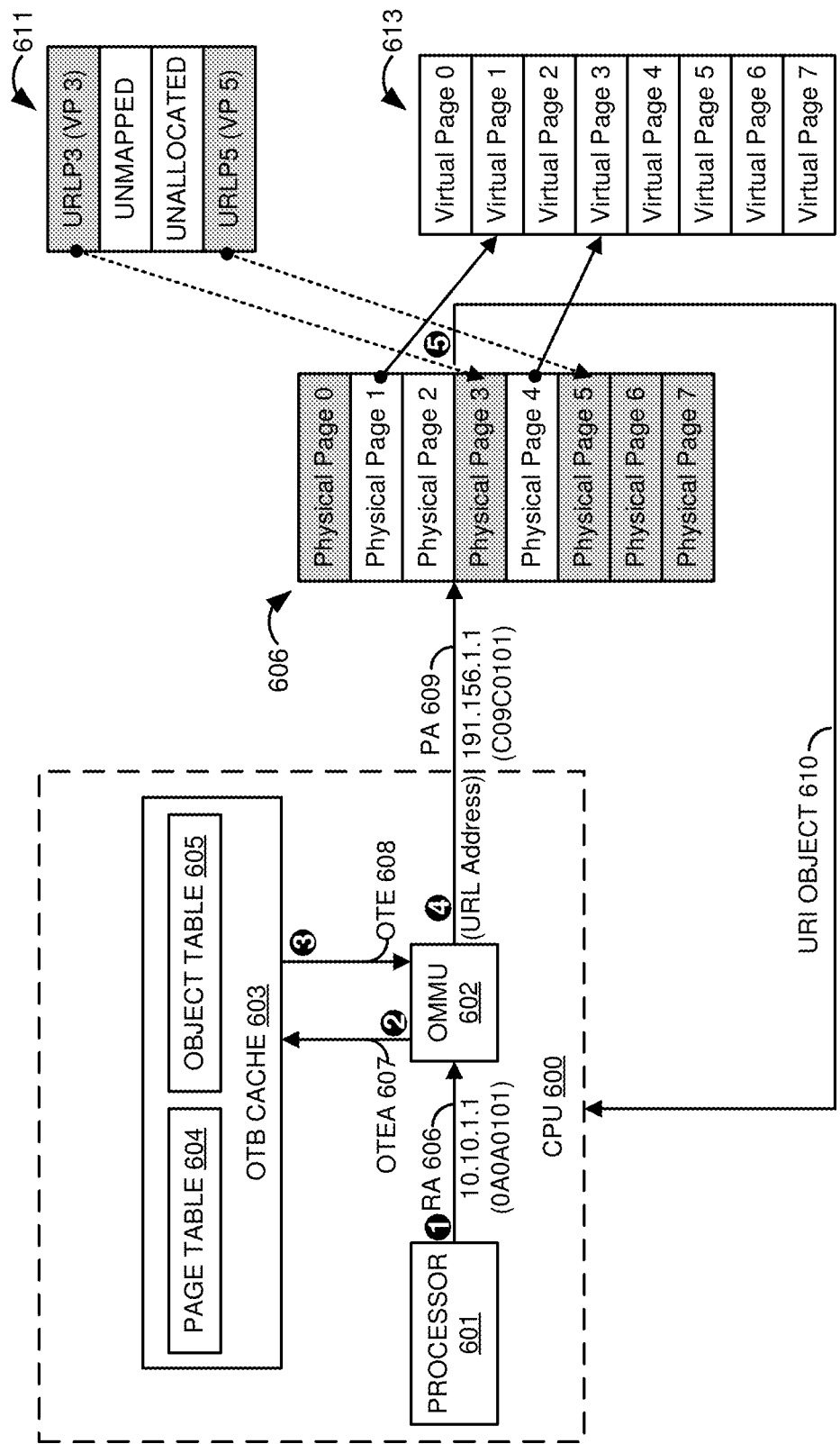
FIG. 6 is a block diagram that illustrates an operation of using an object memory management unit with expanded virtual memory space in an exemplary implementation.
Figure 7:
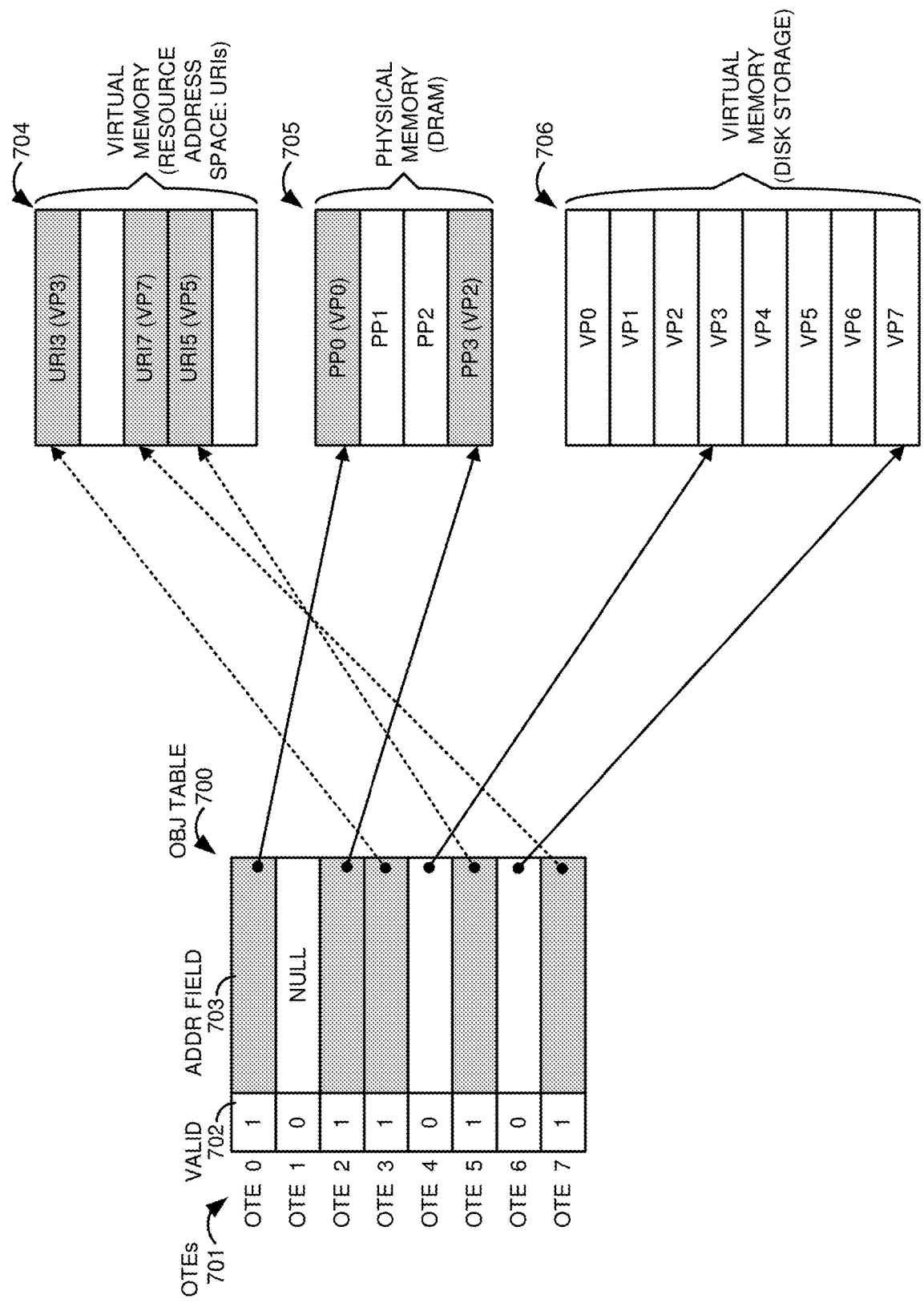
FIG. 7 is a block diagram that illustrates an object table having entries mapped to physical memory or virtual memory in an exemplary implementation.
Figure 8:
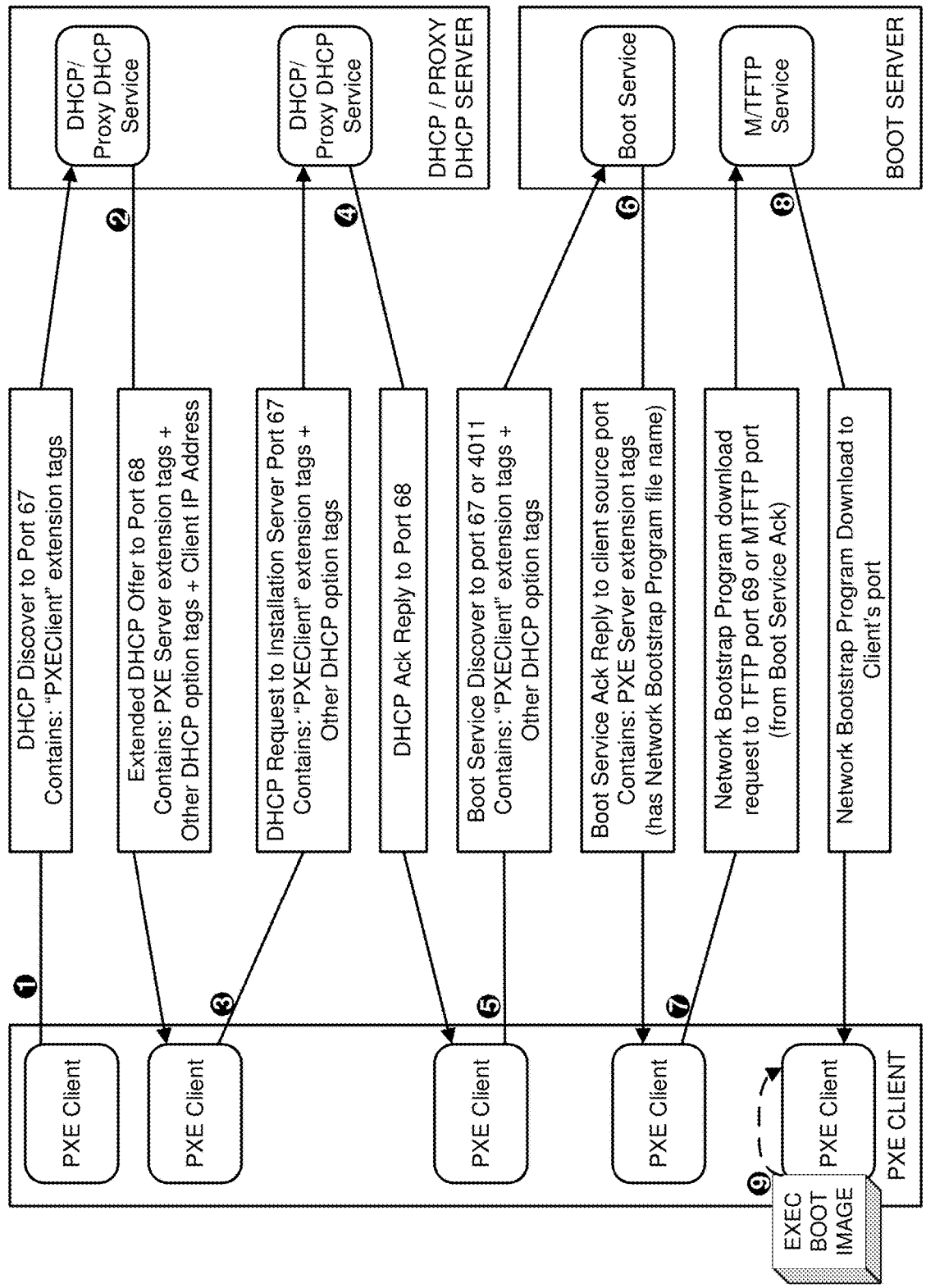
FIG. 8 is a flow diagram that illustrates an operation of a pre-boot execution environment (PXE) boot procedure in an exemplary implementation.
Figure 9:
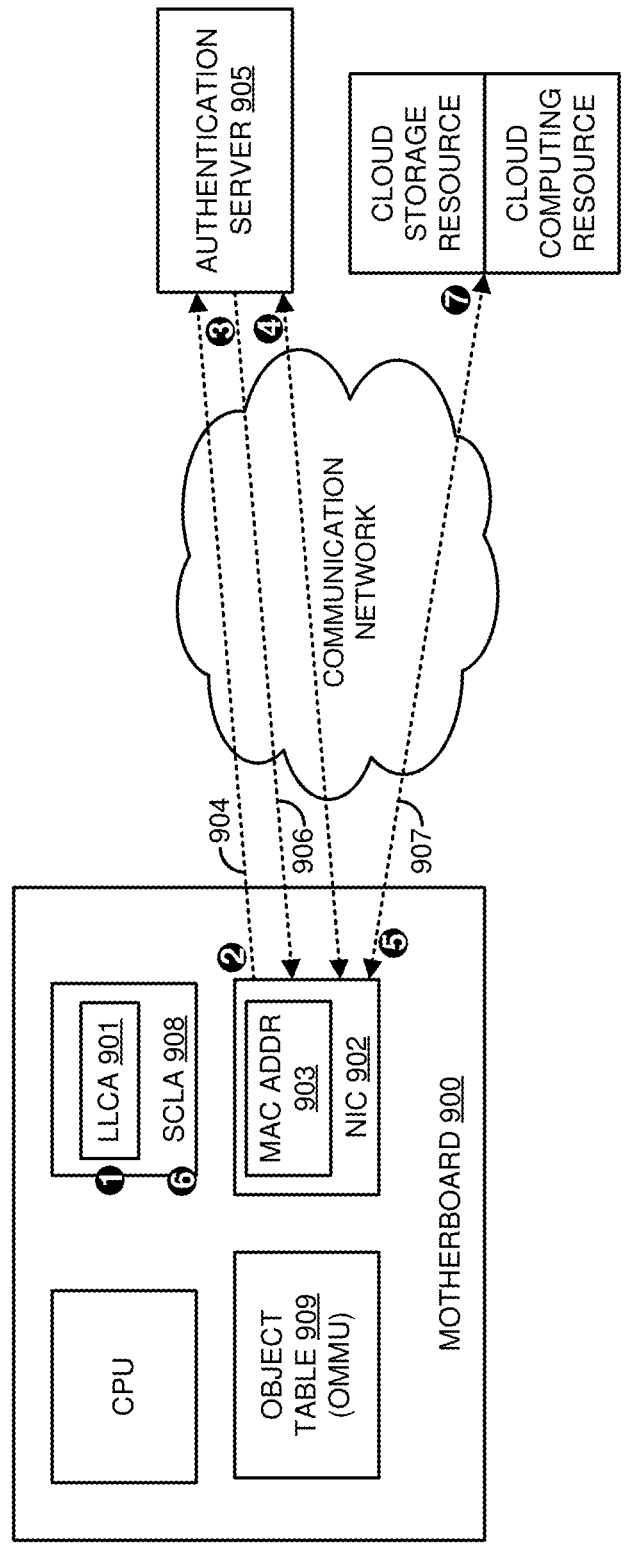
FIG. 9 is a block diagram that illustrates an operation of a bootstrap process in an exemplary implementation.
Figure 10:
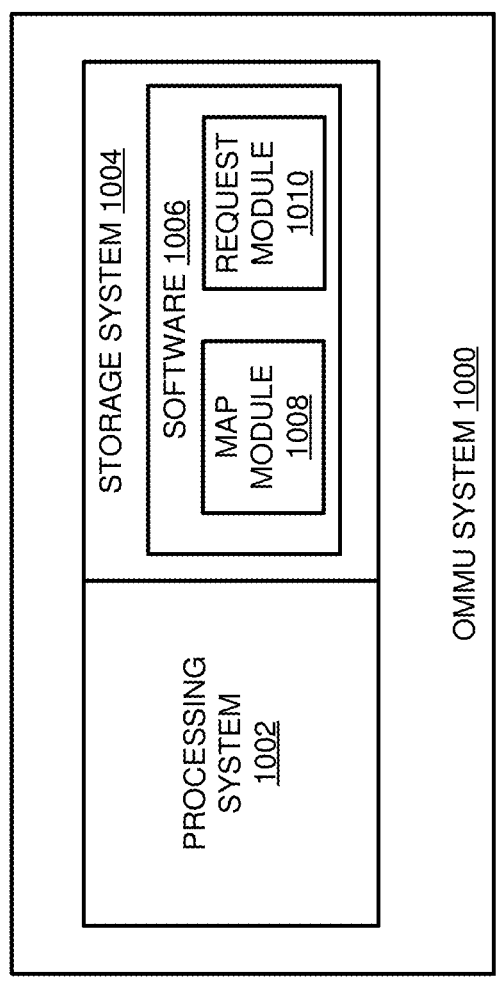
FIG. 10 is a block diagram that illustrates an object memory management unit (OMMU) system in an exemplary implementation.

Referring now to the drawings, FIG. 1 illustrates a system that uses only physical addressing, while FIG. 2 illustrates a system that uses virtual addressing using physical main memory as the page table cache. FIG. 3 illustrates the steps required to provide address translation from virtual address space to physical address space. FIG. 4 illustrates the steps that the CPU hardware performs to provide address translation from virtual address space to physical address space using on-chip translation lookaside buffer cache memory. FIG. 5 illustrates a virtual memory system organized as an array of N contiguous byte-sized cells called a virtual page, where part of the virtual address space is mapped to local storage disk and part is mapped to universal resource address space. FIG. 6 illustrates a system using an Object Memory Management Unit with expanded virtual memory space that includes the universal resource address space in an exemplary implementation. FIG. 7 illustrates the basic organization of an object table in an exemplary implementation. FIG. 8 illustrates a standard pre-execution environment (PXE) boot procedure, FIG. 9 illustrates an enhanced bootstrap process. FIG. 10 is a block diagram that illustrates a computing system.

Most computing systems support the notion of virtual memory. Virtual memory plays a key role in the design of hardware exceptions, assemblers, linkers, loaders, shared objects, files, and processes. Virtual Memory makes it possible to read or modify the contents of a disk file by reading or writing memory locations. It also permits loading or transferring of the contents of a file into memory without performing an explicit copy operation.

To understand the leverage that virtual memory provides, we first define the concept of an address space. An address space is an ordered set of nonnegative integer addresses (i.e. 0, 1, 2 . . . N). If the integers in the address space are consecutive, then we say that it is a linear address space or LAS. A basic computer system has a physical address space or PAS that corresponds to the M bytes of physical memory in the system (i.e. 0, 1, 2 . . . M−1).

The concept of an address space makes a clean distinction between data objects (e.g. bytes) and their attributes (e.g. addresses). We can thus generalize and allow each object to have multiple independent addresses, each chosen from a different address space. Thus, each byte of main memory has a virtual address chosen from a virtual address space and a physical address chosen from a physical address space.

In a system with virtual memory, the CPU generates virtual addresses from an address space of $N=2^n$ addresses called the virtual address space or VAS: $\{0, 1, 2 \ldots N-1\}$. The size of an address space is characterized by the number of bits that are needed to represent the largest address. For example, a virtual address space with $N=2^n$ addresses is called an n-bit address space. Modem systems typically support either 32-bit or 64-bit virtual address spaces.

Virtual memory provides three important capabilities:

(1) It uses main memory efficiently by treating it as a cache for an address space stored on disk, keeping only the active areas in main memory, and transferring data back and forth between local storage disk and physical memory as needed.

(2) It simplifies memory management by providing each process with a uniform address space.

(3) It protects the address space of each process from corruption by other processes.

Virtual address space varies according to the system's architecture and operating system. Virtual address space depends on the architecture of the system because it is the architecture that defines how many bits are available for addressing purposes. Virtual address space also depends on the operating system because the manner in which the operating system was implemented may introduce additional limits over and above those imposed by the architecture.

Formally, address translation is a mapping between the elements of an N-element virtual address space (VAS) and an M-element physical address space (PAS) and is defined as:

$$\text{MAP: VAS PAS U } \emptyset$$

Where

MAP (A)=A', if data at virtual address A in VAS is present at physical address A' in PAS (also called a page hit);

Else

MAP (A)=Ø, if data at virtual address A in VAS is not present in physical memory (also called a page miss).

The terms "page hit" and "page miss" are terms that are familiar to those skilled in the art. Those skilled in the art are also aware that to support the translation of virtual addresses to physical address on the fly, special memory management hardware known as a MMU (Memory Management Unit) is implemented in the Central Processing Unit (CPU).

Referring now to FIG. 1, a system is illustrated that uses only physical addressing. FIG. 1 include a central processing unit (CPU) 100 and main memory 101 which is organized as an array of byte-sized cells. The first byte has an address 0 (i.e. 00000000), the next byte has an address of 1 (i.e. 0000001) and so on until M−1. In this simple setup, the CPU 100 has access to main memory 101 by generating a physical address 102. The main memory 101 responds with a data word 103 comprise four bytes of data, in this case starting at memory address 4 (i.e. 00000004). FIG. 1 demonstrates that in the absence of an MMU, when the CPU accesses physical memory in the form of dynamic random-access memory (DRAM), the actual DRAM locations never change (i.e., memory address 128 is always the same physical location within DRAM).

FIG. 2 is a block diagram that illustrates a system that uses virtual addressing. The system of FIG. 2 includes CPU 300 and main memory 205. CPU 300 comprises processor 201 and memory management unit (MMU) 203. Processor 201 is connected to MMU 203 via virtual address bus 202. Virtual address bus 202 is connected to main memory 205 which is organized as an array of byte-sized cells via a physical address bus 204. The first byte has an address 0 (i.e. 00000000), the next byte has an address of 1 (i.e. 00000001) and so on until M−1.

FIG. 2 demonstrates that with an MMU 203, virtual memory addresses go through a translation step prior to each physical memory access. In the scenario of FIG. 2, the processor 201 accesses main memory 205 by generating virtual address 202 which is then converted into a physical address 204 by MMU 203 inside the CPU 200. MMU 203 translates virtual addresses on the fly using a lookup table stored in main memory 205 whose contents are managed by the operating system. Main memory 205 responds with a data word 206 starting at memory address 4 (i.e. 00000004).

Some systems utilize data structures called page tables to perform the virtual address space to physical address space efficiently. FIG. 3 demonstrates how the MMU 302 uses a data structure called a page table 304 to perform virtual address space to physical address space translation. The page table 304 is conventionally stored in physical main memory 303, which is typically dynamic random-access memory (DRAM).

The steps that the CPU 300 hardware performs to translate an address from virtual address space to physical address space are enumerated below:

Step 1: The processor 301 generates a virtual address (VA) 305 and sends it to the MMU 302.

Step 2: The MMU 302 generates the page table entry address (PTEA) 306 and requests it from main memory 303 which performs a look-up in page table 304.

Step 3: Main memory 303 returns the page table entry (PTE) 307 to the MMU 302.

Step 4: The MMU 302 constructs the physical address (PA) 308 and sends it to cache/main memory 303.

Step 5: The cache/main memory 303 returns the requested data word 309 to the processor 301.

Thus every time the processor 301 generates a virtual address 305, the MMU 302 must refer to page table 304 in order to translate the virtual address into a physical address. To elaborate, a control register in processor 301, called the page table base register (PTBR), points to the current page table in main memory 303. The n-bit virtual address has two components: a p-bit virtual page offset (VPO) and an (n−p)-bit virtual page number (VPN). The MMU 302 uses the VPN to select the appropriate PTE 307. For example, VPN 0 selects PTE 0, VPN 1 selects PTE 1, and so on. The corresponding physical address is the concatenation of the physical page number (PPN) from the page table entry and the VPO from the virtual address. Notice that since the physical and virtual pages are both P bytes, the physical page offset (PPO) is identical to the VPO.

FIG. 4 illustrates an enhanced version of an MMU-based virtual memory system. To improve performance of the virtual address space to physical address space translations, most CPUs provide memory caches that store the page tables 404 on the CPU chip 400 itself in a cache memory called the translation lookaside buffer (TLB) 403. With a TLB 403, the process of translating a virtual address to a physical address is identical as that shown in FIG. 3, with the exception of the page table 404 being resident in a TLB 403 cached on-chip in the CPU 400, which provides a performance improvement.

FIG. 4 illustrates the steps that the CPU 400 hardware performs for address translation from virtual address space to physical address space using on-chip Translation Lookaside Buffer 404 cache memory:

Step 1: The Processor 401 generates a virtual address (VA) 406 and sends it to the MMU 402.

Step 2: The MMU 402 generates the page table entry address (PTEA) 407 and requests it from the TLB cache memory 403 which stores a page table 404.

Step 3: The Page Table 404 returns the page table entry (PTE) 408 to the MMU 402.

Step 4: The MMU 402 constructs the physical address (PA) 409 and sends it to the main memory 405.

Step 5: The main memory 405 returns the requested data word 410 to the processor 401.

In a cloud computing environment, it becomes necessary to provide address translation from a new address space comprised of the universe of all Internet addresses. This disclosure provides an abstraction of a new virtual address space defined as the universal resource address space (URAS). This universal resource address space enables translation for an access to a location in the system's virtual memory space into an access to a memory-mapped address that corresponds to a physical or virtual resource on the Internet or cloud. Those skilled in the art know that these resource addresses are referred to as universal resource identifiers or URIs on the Internet. Thus, a universal resource address space (URAS) may be defined as an ordered set of universal resource locators (URLs), e.g. {http://192.156.1.1, http://192.156.1.2, . . . http://192.1.156.1.N} where each entry is the URL (i.e., the Internet address) of a non-local compute, storage, or service resource. This URL format is familiar to those skilled in the art as the fundamental resource locator format used on the Internet.

It should also be evident to those skilled in the art that the conventional MMU apparatus shown in FIG. 4 will be inadequate to perform a URAS-to-physical address space translation.

FIG. 5 illustrates a virtual memory 500 organized as an array of N contiguous byte-sized cells called a virtual page (VP) 504. Part of the virtual address space is mapped to the local storage disk 501 and part is mapped to the universal resource address space 502. Each byte has a unique virtual address that serves as an index into the array. The contents of the array on disk are cached in main memory in physical pages called PP 505. As with any other cache in the memory hierarchy, the data on disk is partitioned into blocks that serve as the transfer units between the disk and the main memory or between the Universal Resource Address Space and main memory. Virtual memory systems handle this by partitioning the virtual memory into fixed-sized blocks called virtual pages (VPs) 504. Each virtual page is P=2 p bytes in size. Similarly, physical memory 503 is partitioned into physical pages (PPs) 505, also P bytes in size (physical pages are also referred to as page frames).

At any point in time, the set of virtual pages 504 is partitioned into three disjoint subsets:

Unallocated: Pages that have not yet been allocated (or created) by the VM system. Unallocated blocks do not have any data associated with them, and thus do not occupy any space on disk 501 or the URAS 502.

Mapped: Allocated pages that are currently cached in physical memory.

Unmapped: Allocated pages that are not cached in physical memory.

The example in FIG. 5 shows a small virtual memory with eight virtual pages. Virtual pages 0 and 3 have not been allocated yet, and thus do not yet exist on disk. Virtual pages 1, 4, and 6 are cached in physical memory. Virtual pages 2, 5, and 7 are allocated, but are not currently cached in main memory.

Each byte has a unique virtual address that serves as an index into the array. The contents of the array on disk 501 or the URAS 502 are cached in main memory 503 in physical pages 505. As with any other cache in the memory hierarchy, the data on disk is partitioned into blocks that serve as the transfer units between the disk 501 and the main memory 503, or between the universal resource address space 502 and main memory 503.

FIG. 6 discloses a novel apparatus called the Object Memory Management Unit (OMMU) 602 that overcomes such limitations of an MMU. The OMMU 602 apparatus disclosed herein is designed to perform unique translation from an address in the expanded virtual address space that incorporates the universal resource address space to the physical memory address space of a local machine. This mapping or translation allows any compute, storage, or Internet resource to be mapped into the local system's physical memory space and hence appear as a local resource. As described above, each entry in the universal resource address space may be a URL of an existing plurality of Internet resources, such as a block of compute resources at Amazon Web Services, for example. Resources located at each URL may be accessed using existing Internet protocols for data exchange. For example, the data exchange may be facilitated by using the HTTPS protocol and its associated command set of GET, PUT, POST, and DELETE. More advanced data exchanges between a local node and the memory-mapped resource at any URL may be achieved by using advanced programming techniques such as TCP/IP, Unix sockets, and leveraging a plurality of software libraries such as curl URL request library (cURL) that are very well known to those skilled in the art. In this example, virtual memory is provided in the form of universal resource address space 611 and disk storage 613.

The OMMU 602 incorporates a data structure called the object table (OT) 605. The object table 605 data structure is similar to the page table 604 data structure used with conventional MMUs Multiple copies of the OT exist in the object translation buffer 603 cache memory implemented on the OMMU 602. An object table 605 contains a plurality of resource addresses or URIs and thus it becomes possible to create a plurality of cloud resource clusters, each defined by unique resource addresses, that are orthogonal to each other, isolated from each other and thus provide data security, process security, and isolation without the need for any additional apparatus such as firewalls, virtual local area networks (LANs), or virtual switches. Nodes or processes that are mapped into a particular resource address space can only be aware of other nodes, processes, or resources in the same object table 605 and all other resource address spaces are completely invisible to them. This provides fine grained privacy at the process level on a physical or virtual machine.

The OMMU 602 keeps track of which URLs are currently permitted and mapped into the client system's physical address space similar to how a swap file is utilized (i.e., files stored on the disk are mapped into the memory space of a system by an MMU). The OMMU 602 may be programmed by the firmware, the operating system, the guest operating system of a physical or virtual machine, or be hardwired to create a plurality of resource topologies that combine local and cloud-based resources for any single system on the Internet. This also allows for the creation of secure private cloud environments by virtue of populating the OT 605 tables with only the URLs of authorized and authenticated resources available to a specific user or process executing at any node.

The steps that the CPU 600 hardware performs to translate an address from Virtual Address Space to Resource Address Space are enumerated below:

Step 1: The processor 601 generates a local resource address 606 (e.g., 10.10.1.1) and sends it to the OMMU 602.

Step 2: The OMMU 602 generates the object table entry address (OTEA) 607 and requests it from the object translation buffer 603 cache memory.

Step 3: The OTB 603 performs a look-up in object table 605 to check for a matching entry.

Step 4: If there is a match or "hit", the OTB 603 returns the object table entry (OTE) 608 to the OMMU 602.

Step 5: The OMMU 602 constructs the physical address (i.e., a memory-mapped URL address 609, shown as 192.156.1.1 in this example) and sends it to main memory 606.

Step 6: The main memory 606 returns the requested universal resource identifier (URI) object located at 192.156.1.1 for the processor 601 to access using a known protocol such as HTTPS.

The present disclosure provides a very efficient technique to facilitate the activation, discovery, and connection of any node to a plurality of Internet resources using a simple representational state transfer (ReST) interface. A major benefit of using the OMMU 602 apparatus is that once the OMMU 602 maps a URI object 610 as outlined in FIG. 6, the data interchange with that URI object 610 may be achieved in a trusted and secure manner by using a ReST interface. Those practiced in the art know that a ReST interface allows the creation and presentation of complex Internet services in a minimalist way by the use of simple GET, PUT, POST and DELETE commands over HTTPS which supports the use of secure socket layer (SSL) and transport layer security (TLS) encryption for all transactions between any two endpoints in a resource address space. Thus, a ReST-ful interface may be employed as an enhanced boot method for a "motherboard" and its constellation of approved and authenticated cloud resources in a given resource address space, and map them into the "motherboard's" local address space in a secure manner. The actual process of booting up using a EMITS GET/SET request protocol is described in further detail later in this disclosure.

In FIG. 7 an object table (OT) 700 is shown as an array of object table entries (OTEs) 701. Each page in the virtual address space has an OTE 701 at a fixed offset in the page table. Each OTE 701 consists of a valid bit 702 and an n-bit address field 703. Each entry in the OT 700 is either a pointer into physical memory 705 or a pointer to virtual memory in the form of the resource address space 704 or the disk 706. The conventional page table 304, 404, and 603 used by virtual memory systems is a modality of the object table 700 (i.e., any object table entry 701 may be designated as either a conventional page table entry 703 or as a universal resource address table entry 703).

Most operating systems provide a separate page table, and thus a separate virtual address space, for each process that is executing under the OS. The OMMU also allows mapping of virtual addresses to universal resource addresses (URI or URL) on a per-process basis, for each process executing on the "motherboard." This is important because in a cloud infrastructure there is an increasing use of "containers" as a mechanism to execute a plurality of applications in parallel under a common operating system. In essence, "containers"

are nothing but stand-alone processes that are bound to a virtualized kernel on a per-process basis. In Linux, these "containers" are called Linux Containers or LXC and are well known to those skilled in the art. However, "containers" cannot guarantee security of each process' data because it is not difficult to have a rogue process executing as a "container" assume root privileges and thus be fully empowered to read, write, and execute data and code belonging to other processes or "containers."

In at least one implementation, the "motherboard" may use the OMMU apparatus and bootstrap method to ensure that processes (i.e., "containers") only boot from a predetermined virtual address space (i.e., only authorized universal resource addresses which are loaded into the object table 700 using a ReST protocol from authorized servers). By abstracting the "container" virtual address space for network and Internet resources and mapping it to a restricted universal resource address space, a "container" is prevented from launching a rogue process that can compromise the data of other containers.

Referring now to FIG. 8, a standard preboot execution environment (PXE) boot procedure is illustrated. The PXE specification describes a standardized client-server environment that boots a software assembly, retrieved from a network, on PXE-enabled clients. On the client side it requires only a PXE-capable network interface controller (NIC), and uses a small set of industry-standard network protocols such as dynamic host configuration protocol (DHCP) and trivial file transfer protocol (TFTP).

The idea of PXE originated along with other well-known protocols like the bootstrap protocol (BOOTP), DHCP, and TFTP, and forms part of the unified extensible firmware interface (UEFI) standard. Given fast and reliable local area networks (LANs), PXE is the most frequent choice for operating system boot, installation, and deployment.

FIG. 8 illustrates how the PXE protocol operates. The client initiates the protocol by broadcasting a DHCPDISCOVER containing an extension that identifies the request as coming from a client that implements the PXE protocol. Assuming that a DHCP server or a Proxy DHCP server implementing this extended protocol is available, after several intermediate steps, the server sends the client a list of appropriate boot servers. The client then discovers a boot server of the type selected and receives the name of an executable file on the chosen boot server. The client uses TFTP to download the executable from the boot server. Finally, the client initiates execution of the downloaded image. At this point, the client's state must meet certain requirements that provide a predictable execution environment for the image. Important aspects of this environment include the availability of certain areas of the client's main memory, and the availability of basic network I/O services.

The sequence of events as illustrated in FIG. 8 are as follows:

Step 1. The client broadcasts a DHCPDISCOVER message to the standard DHCP port 67. An option field in this packet contains the following:
- A tag for client identifier (i.e. universally unique identifier, or UUID).
- A tag for the client universal network driver interface (UNDO version.
- A tag for the client system architecture.
- A DHCP option 60, Class ID, set to "PXEClient: Arch: xxxxx: UNDI: yyyzzz".

Step 2. The DHCP or Proxy DHCP service responds by sending a DHCPOFFER message to the client on the standard DHCP reply port 68. If this is a Proxy DHCP service, then the client IP address field is null (0.0.0.0). If this is a DHCP service, then the returned client IP address field is valid.

At this point, other DHCP services and BOOTP services also respond with DHCP offers or BOOTP reply messages to port 68. Each message contains standard DHCP parameters, including an IP address for the client and any other parameters that the administrator might have configured on the DHCP or Proxy DHCP service.

The timeout for a reply from a DHCP server is standard. The timeout for re-broadcasting to receive a Proxy DHCPOFFER or a DHCPOFFER with PXE extensions is based on the standard DHCP timeout, but is substantially shorter to allow reasonable operation of the client in standard BOOTP or DHCP environments that do not provide a DHCPOFFER with PXE extensions.

Step 3. From the DHCPOFFER(s) that it receives, the client records the following:
- The client IP address (and other parameters) offered by a standard DHCP or BOOTP Service.
- The boot server list from the boot server field in the PXE tags from the DHCPOFFER.
- The discovery control options (if provided).
- The multicast discovery IP address (if provided).

Step 4. If the client selects an IP address offered by a DHCP service, then it must complete the standard DHCP protocol by sending a request for the address back to the service and then waiting for an acknowledgment from the service. If the client selects an IP address from a BOOTP reply, it can simply use the address.

Step 5. The client selects and discovers a boot server. This packet may be sent broadcast (port 67), multi cast (port 4011), or unicast (port 4011) depending on discovery control options included in the previous DHCPOFFER containing the PXE service extension tags. This packet is the same as the initial DHCPDISCOVER in Step 1, except that it is coded as a DHCPREQUEST and now contains the following:
- The IP address assigned to the client from a DHCP service.
- A tag for client identifier (MID).
- A tag for the client UNDI version.
- A tag for the client system architecture.
- A DHCP option 60, Class ID, set to "PXEClient: Arch: xxxxx: UNDI: yyyzzz".
- The boot server type in a PXE option field.

Step 6. The Boot Server unicasts a DHCPACK packet back to the client on the client source port. This reply packet contains:
- Boot file name.
- Multicast trivial file transfer protocol MTFTP 1 configuration parameters.
- Any other options the network bootstrap program (NBP) requires before it can be successfully executed.

Step 7. The client downloads the executable file using either standard TFTP (port 69) or MTFTP (port assigned in boot server Ack packet). The file downloaded and the placement of the downloaded code in memory is dependent on the client's CPU architecture.

Step 8. The PXE client determines whether an authenticity test on the downloaded file is required. If the test is required, the client sends another DHCPREQUEST message to the boot server requesting a credentials file for the previously downloaded boot file, downloads the credentials via TFTP or MTFTP, and performs the authenticity test.

Step 9. Finally, if the authenticity test succeeded or was not required, then the PXE client initiates execution of the downloaded code.

It will be evident to those practiced in the art that the PXE boot process is complex and has many potential security flaws. For example, the fundamental assumption is that there is a secure DHCP server available to the client. This cannot be guaranteed because a malicious attacker could easily provide a spoofed IP address for a DHCP server and fool the client into connecting with a malicious DHCP server. Once the client connects to the malicious server, the attacker can download any malware and gain entry into the computer and network environment.

The UEFI specification tries to remedy this potential security loophole by proposing that a trusted relationship may be created between the motherboard (platform), the motherboard firmware, and the operating system. This trust mechanism uses two pairs of asymmetric keys and an elaborate protocol to validate any data exchange. Those practiced in the art will agree that this protocol is complex and requires the storage of keys in non-erasable, tamper-proof, non-volatile memory. This complex protocol enables passing public keys from the OS to the platform firmware so that these keys can be used to securely pass information between the OS and the platform firmware.

Typically, the OS has been unable to communicate sensitive information or enforce any sort of policy because of the possibility of spoofing by a malicious software agent. That is, the platform firmware has been unable to trust the OS. By enrolling these public keys, authorized by the platform owner, the platform firmware can now check the signature of data passed by the operating system. Of course, if the malicious software agent is running as part of the OS, such as a rootkit, then any communication between the firmware and operating system still remains the subject of spoofing as the malicious code has access to the exchange key.

A mechanism to provide the same functionality as described above with respect to FIG. 8 but with more security by using a ReST-ful interface over HTTPS will now be discussed with respect to FIG. 9. The technique of FIG. 9 leverages the low-level functionality of the platform's network interface controller that supports PXE (i.e., is capable of supporting TCP/IP sockets in an OS-absent environment).

FIG. 9 illustrates an exemplary implementation of a boot process. The description of FIG. 9 makes reference to items identified in FIG. 6 for ease of explanation, but note that the boot process provided in FIG. 9 is not limited to the specific implementation of FIG. 6. The process is as follows:

Step 1. When a "motherboard" 900 powers up, apiece of stand-alone software called a low-level client agent (LLCA) 901 is executed as the initial program load (IPL) process. This LLCA 901 may be programmed into the firmware, loaded into the motherboard via a USB drive, loaded from a local disk, or provided any other way.

Step 2. The LLCA 901 will utilize the network interface controller (NIC) 902 device built in or attached to motherboard 900 to send out a HTTPS GET 904 request to an authentication server 905 listening on a pre-determined port address on a specific URL selected by the system administrator. This port address may be changed periodically by the system admin for security purposes. This prevents malicious snooping and tampering that is made possible in a DHCP protocol, by common knowledge that port 67 is the designated DHCP port. In addition, since the request is made using HTTPS GET request, data interchange is secure since HTTPS uses SSL/TLS.

All data generated by the requesting "motherboard" is tagged with the MAC address 903 of the network interface controller (NIC) 902 of the requesting "motherboard" 900 and a time stamp. This provides traceability of all requests that is useful for maintenance, debugging, and security of the network.

Step 3. The authentication server 905 will respond with a challenge 906 to the "motherboard" that generated the HTTPS GET request.

Step 4. Upon receiving a valid response, the authentication server 905 will download the resource addresses (URLs) of a set of trusted URI objects into an object table 605 data structure in the object translation buffer 604 on the OMMU 602. For systems that do not have a physical OMMU 602 available, the object table 605 data structure may be cached in physical main memory 606 and a software address translation may be employed by the requesting "motherboard."

Step 5. Next the client agent can generate HTTPS GET/SET requests 907 to start data interchange with the authorized URI objects, and download any specific operating system or virtual machine software images required to fully configure the requesting "motherboard" per policy-based protocol.

Step 6. During this data interchange, based on applicable security and privacy policies, the local LLCA 901 is pre-empted by a downloaded system level client agent (SLCA) 908 software module that is matched to the desired operating system. The SLCA 908 then executes the code that sets up the object tables 909 in the OMMU and maps Internet and cloud resources into the physical memory space of the requesting "motherboard."

Step 7. When the SLCA 908 completes its tasks, the desired operating environment comprising all the authorized Internet and cloud resources are available as local resources to the requesting "motherboard."

It should be clear to those practiced in the art that the OMMU 602 apparatus provides a major benefit in this process. Once the OMMU 602 maps a URI object 610 as outlined in FIG. 6, the data interchange with that URI object 610 may be achieved in a trusted and secure manner by using a representational state transfer (ReST) interface. A ReST interface allows the creation and presentation of complex Internet services in a minimalist way by the use of simple GET, PUT, POST, and DELETE commands over HTTPS, which supports the use of SSL/TLS encryption for all transactions between any two endpoints in a resource address space. Thus, a ReST-ful interface may be employed as an enhanced boot method for a "motherboard" and its constellation of approved and authenticated cloud resources in a given resource address space, and map them into the "motherboard's" local address space in a secure manner.

Some example implementations will now be presented.

Example 1

An apparatus and method to federate a plurality of physical and virtual compute, storage, and internet resources and make them available as a local resource to any compute node;

said apparatus comprising an Object Memory Management Unit with a built-cache memory that is used to translate virtual addresses generated by a CPU into physical addresses on an end-user node on the internet;

said Object Memory Management Unit providing the capability to expand the Virtual address space to include the Universal Resource Address Space comprising of all the Universal Resource Locators or URLs on the internet;

said Object Memory Management Unit providing the capability to translate virtual addresses from the Universal Resources Address Space into physical addresses enabling local access to URLs on the internet;

said Object Memory Management Unit providing the capability to map a plurality of internet and cloud based compute, storage, service resources into the local physical main memory of end-user node on the internet;

said method comprising of a novel bootstrap method that implements a ReST interface to connect to resources on the internet via a HTTPS protocol to enable the bootstrap process of any motherboard platform;

said method executing a Low Level Client Agent software program on to the motherboard;

said Low Level Client Agent either being loaded on to the motherboard via a USB drive, or embedded in the motherboard firmware, or downloaded to the motherboard via the network interface of the motherboard;

said method utilizes a challenge/response authentication protocol over a network connection with a dedicated authentication server that is set to listen on a predetermined port address;

said authentication server port address being selected by an authorized systems administrator;

said port address of the authentication server being capable of being changed at random to maintain access security;

said method utilizing HTTPS protocol to implement the said challenge challenge/response protocol;

said method utilizing HTTPS protocol to download the System Level Client Agent program code onto the mother board from the authentication server;

said System Level Client Agent utilizing the HTTPS protocol to download a list of authorized and available Universal Address Resources and loading said list into the Object Table data structure in the cache-memory of said Object Memory Management Unit;

said System Level Client Agent utilizing the HTTPS protocol to download the Operating System on to the motherboard and transferring control to the downloaded Operating System;

said Operating System's virtual memory management system using the Object Table within Object Memory Management Unit cache-memory to map virtual addresses on local disk drive to physical addresses in main memory as well as using the Object table to map Universal Resource Addresses (i.e., URLs) into the local physical memory to enable the end-user node to access resources as local resources.

Example 2

The apparatus and method recited in Example 1, where in the Object Memory Management Unit hardware apparatus is integrated onto the CPU silicon.

Example 3

The apparatus and method recited in Example 1 where the Object Memory Management Unit apparatus is implemented as a standalone silicon device to be interfaced to a commercially available CPU.

Example 4

The apparatus and method recited in Example 1 where the Object Memory Management Unit hardware does not implement an integrated cache-memory.

Example 5

The apparatus and method recited in Example 1, where the Object Memory Management Unit apparatus is implemented as a software program and uses the Main Memory as the location for the Object Table data storage.

Example 6

The apparatus recited in Example 1 where the OMMU supports the storage of encrypted data within an Object Table Entry;

said Object Table Entry being composed of a plurality of encrypted and unencrypted fields;

said encrypted fields encapsulating "objects" containing data structures that are exchanged between any two points that are connected over a network or internet to deploy and access services at either end;

said "objects" containing attributes and methods that are interpreted and acted upon by the receiving node to deploy and provide services or data requested by the other end of a network or internet connection;

said "objects" encapsulating private keys to encrypt and decrypt data to be exchanged between any two connected nodes in a secure manner;

said "objects" providing network address translation and performing encrypted/decrypted I/O on resources bounded by the translated addresses including network addresses.

Example 7

The apparatus recited in Example 1 used in conjunction with existing PXE bootstrap protocols to allow the download and deployment of internet resources and permit them to be mapped into the local main memory and permit access to those resources as local resources.

Example 8

The apparatus and method recited in Example 1 where the compute node is a Virtual Machine and the OMMU is implemented in hardware on the host CPU.

Example 9

The apparatus and method recited in Example 1 where the compute node is a virtual machine and the OMMU function is implemented as a software program module.

Example 10

The apparatus and method recited in Example 1 where the compute node is an individual process or "container" executing on a host physical CPU or a Virtual Machine and has other compute, storage, network and internet resources and services mapped into the process' or "container's" virtual address space;

where said process or container utilizes the OMMU implemented in hardware on the host CPU or an OMMU implemented as a software program on a Virtual Machine executing on a host CPU to perform virtual to physical address translation that is unique to each process or container, thus securing the privacy of each process or "container" from a plurality of other co-resident processes or "containers" on the same physical or virtual machine;

where said virtual to physical address translation performed by the OMMU permits any process or "container" to map a plurality of compute, storage, network and internet services including cloud resources as logical local resources for the process or "container" to provide file I/O (i.e., read/write operations) on any file or memory-mapped device included in the said mapping;

where a restricted and authorized set of Universal Resource Addresses are mapped into the virtual address space and the OMMU apparatus provides a virtualization of network and internet addresses on a per process or per "container" basis thus controlling the access to a plurality of other processes or "containers" executing simultaneously on either a physical machine or a virtual machine.

FIG. 10 is a block diagram that illustrates an OMMU system in an exemplary implementation. OMMU system 1000 is an example of OMMU 602, although other examples may exist as described herein. OMMU system 1000 includes processing system 1002 and storage system 1004. Storage system 1004 further includes software 1006, which is configured to operate OMMU system 1000 as described herein.

Processing system 1002 may comprise a microprocessor and other circuitry that retrieves and executes software 1006 from storage system 1004. Software 1006 includes map module 1008 and request module 1010. Processing system 1002 may be implemented within a single processing device, but may also be distributed across multiple processing devices or sub-systems that cooperate in executing program instructions. Examples of processing system 1002 include general-purpose central processing units, application specific processors, and logic devices, as well as any other type of processing device. In some implementations, processing system 1002 may comprise the main CPU or CPUs of a computing system, however, in other examples, processing system 1002 may comprise separate hardware within a computing system.

Storage system 1004 may comprise any storage media readable by processing system 1002 and capable of storing software 1006. Storage system 1004 may include volatile and nonvolatile, removable and non-removable media implemented in any method or technology for storage of information, such as computer readable instructions, data structures, program modules, or other data. Storage system 1004 may be implemented as a single storage device, but may also be implemented across multiple storage devices or sub-systems. Storage system 1004 may comprise additional elements, such as a controller to read software 1006 in some examples.

Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

In operation, processing system executes software 1006 to provide the desired OMMU operations described herein. In at least one example, map module 1008 directs processing system 1002, when executed by processing system 1002, to map virtual addresses to local addresses and network addresses, wherein the local addresses correspond to local resources of a computing system, such as dynamic random-access memory (DRAM) or disk storage (flash media, hard disk drives, etc.), and wherein the network addresses correspond to network addresses (URIs and the like). As the mapping is maintained via map module 1008, request module 1010, when executed by processing system 1002, directs processing system 1002 to identify data requests that use the virtual addresses and handle the data requests per the maintained mapping. For example, if a request with a virtual address were mapped to a local address for a local resource, processing system 1002 may access data from the local resource of the computing system. In contrast, if a request with a virtual address were mapped to a network address for a network resource, processing system 1002 may access data in the network resource over the network. The data requests may be generated by the operating system on the host computing system for OMMU system 1000, may be generated by applications executing on the host computing system for OMMU system 1000, or may be generated by any other process on the computing system.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

What is claimed is:

1. A computer-implemented system, said computer-implemented system forming a part of a distributed computing environment, said computer-implemented system comprising:

a processor configured to:
generate a request directed to a Universal Resource Address Space (URAS) comprising a plurality of universal resource indicators (URIs), for retrieving an executable software image therefrom;
execute said executable software image retrieved from said Universal Resource Address Space, and trigger an Object Memory Management Unit, based on execution of said executable software image, to:
expand a virtual address space of said computer-implemented system, said virtual address space comprising a plurality of virtual addresses, and incorporate said Universal Resource Address Space (URAS) therein, and thereby create an expanded virtual address space;
render said expanded virtual address space accessible as a unified combination of said plurality of virtual addresses and said plurality of universal resource indicators, and wherein said plurality of universal resource indicators represent remote, non-local computing resources accessible via Internet;
create a mapping between said expanded virtual address space and a physical memory address space of said computer-implemented system, thereby federating, by virtue of said mapping, said virtual address space, said Universal Resource Address Space and said physical memory address space into a virtually unified resource directly accessible to said computer-implemented system;

translate each of said virtual addresses and said universal resource indicators contained within said expanded virtual address space, into corresponding physical memory addresses contained within said physical memory address space of said computer-implemented system, based on said mapping; and render said virtual addresses and said universal resource indicators directly accessible on said computer-implemented system, in a manner equivalent to accessing said physical memory address space local to said computer-implemented system, by virtue of said mapping and further by virtue of translation of said virtual addresses and said universal resource indicators into said corresponding physical memory addresses; and wherein said processor, upon execution of said executable software image, is further configured to trigger said object memory management unit to:

map a first part of said virtual address space to a local storage disk constituted within said physical memory address space, and to map a second part of said virtual address space to said universal resource address space;

utilize said Universal Resource Address Space as a trust repository for storing private keys in combination with said universal resource indicators, and facilitate at least encryption and decryption of said universal resource indicators via said private keys; and selectively update said universal resource indictors into an object table as trusted URI objects.

2. The computer-implemented system as claimed in claim 1, wherein executable software image is one of an operating system image and a virtual machine image.

3. The computer-implemented system as claimed in claim 1, wherein said Universal Resource Address Space further comprises at least one universal resource indicator selected from said plurality of universal resource indicators, said at least one universal resource indicator rendering said executable software image accessible to said Object Memory Management Unit.

4. The computer-implemented system as claimed in claim 1, wherein said universal resource indicators (URIs) comprised within said Universal Resource Address Space are indicative of remote, non-local computing resources accessible via internet.

5. The computer-implemented system as claimed in claim 1, wherein said Object Memory Management Unit is further configured to translate a request for access to said virtual address space to a request for access to a memory mapped address, said memory mapped address corresponding to at least one of said physical memory address space and said Universal Resource Address Space.

6. A computer implemented method executable on a computer-implemented system, said method comprising the following computer-implemented steps:

generating, by a processor, a request directed to a Universal Resource Address Space (URAS) comprising a plurality of universal resource indicators (URIs), for retrieving an executable software image therefrom;

executing, by said processor, said executable software image retrieved from said Universal Resource Address Space, and triggering, by said processor, an Object Memory Management Unit, based on execution of said executable software image, and wherein the step of triggering the Object Memory Management Unit, further includes the step of configuring the Object Memory Management Unit to:

expand a virtual address space of said computer-implemented system, said virtual address space comprising a plurality of virtual addresses, and incorporate said Universal Resource Address Space (URAS) therein, and thereby create an expanded virtual address space, said expanded virtual address space comprising a unified combination of a plurality of virtual addresses and a plurality of universal resource indicators, and wherein said plurality of universal resource indicators represent remote, non-local computing resources accessible via Internet;

create a mapping between said expanded virtual address space, and a physical memory address space of said computer-implemented system;

federate, by virtue of said mapping, said virtual address space, said Universal Resource Address Space and said physical memory address space into a virtually unified resource directly accessible to said computer-implemented system;

translate each of said virtual addresses and said universal resource indicators contained within said expanded virtual address space, into corresponding physical memory addresses contained within said physical memory address space of said computer-implemented system, based on said mapping;

render, based on said mapping and further based on translation of said virtual addresses and said universal resource indicators to said corresponding physical memory addresses, said virtual addresses and said universal resource indicators directly accessible on said computer-implemented system, in a manner equivalent to accessing said physical memory address space local to said computer-implemented system;

map a first part of said virtual address space to a local storage disk constituted within said physical memory address space, and to map a second part of said virtual address space to said universal resource address space;

utilize said Universal Resource Address Space as a trust repository for storing private keys in combination with said universal resource indicators, and facilitate at least encryption and decryption of said universal resource indicators via said private keys; and selectively update said universal resource indictors into an object table as trusted URI objects.

7. The method as claimed in claim 6, wherein the method further includes the step of translating, by said Object Memory Management Unit, a request for access to said virtual address space, into a request for access to a memory mapped address, said memory mapped address corresponding to at least one of said physical memory address space and said Universal Resource Addresses Space.

8. The method as claimed in claim 6, wherein the step of generating a request directed to a Universal Resource Address Space (URAS), further includes the step of generating a request directed to at least one universal resource indicator selected from said Universal Resource Address Space, said at least one universal resource indicator rendering said executable software image accessible to said Object Memory management Unit.

9. The method as claimed in claim 6, wherein the step of executing said executable software image retrieved from said Universal Resource Address Space, further includes the step of executing at least one of an operating system image corresponding to said computer-implemented system and a virtual machine image corresponding to said computer-implemented system.

10. A non-transitory computer readable storage medium having computer-readable instructions stored thereupon, said computer-readable instructions when executed by a processor of a computer-implemented system, cause the processor to:

generate a request directed to a Universal Resource Address Space (URAS) comprising a plurality of universal resource indicators (URIs), for retrieving an executable software image therefrom;

execute said executable software image retrieved from said Universal Resource Address Space, and trigger an Object Memory Management Unit, upon execution of said executable software image, to:

expand a virtual address space of said computer-implemented system, said virtual address space comprising a plurality of virtual addresses, and incorporate said Universal Resource Address Space (URAS) therein, and thereby create an expanded virtual address space, said expanded virtual address space comprising a unified combination of a plurality of virtual addresses and a plurality of universal resource indicators, and wherein said plurality of universal resource indicators represent remote, non-local computing resources accessible via Internet;

create a mapping between said expanded virtual address space and a physical memory address space of said computer-implemented system, Aid thereby federating, by virtue of said mapping, said virtual address space, said Universal Resource Address Space and said physical memory address space into a virtually unified resource directly accessible to said computer-implemented system;

translate each of said plurality of virtual addresses and said plurality of universal resource indicators contained within said expanded virtual address space, into corresponding physical memory addresses contained within said physical memory address space, based on said mapping; and render, based on said mapping and further based on translation of said virtual addresses and said universal resource addresses into said corresponding physical memory addresses, said virtual addresses and said universal resource indicators directly accessible on said computer-implemented system, in a manner equivalent to providing access to said physical memory address space local to said computer-implemented system;

map a first part of said virtual address space to a local storage disk constituted within said physical memory address space, and to map a second part of said virtual address space to said universal resource address space;

utilize said Universal Resource Address Space as a trust repository for storing private keys in combination with said universal resource indicators, and facilitate at least encryption and decryption of said universal resource indicators via said private keys; and selectively update said universal resource indictors into an object table as trusted URI objects.

11. The computer-readable instructions as claimed in claim 10, wherein the computer-readable instructions when executed by the processor, further cause the processor to:

generate a request directed to at least one universal resource indicator selected from said plurality of universal resource indicators, said at least one universal resource indicator rendering said executable software image accessible to said Object Memory management Unit;

execute at least one of an operating system image corresponding to said computer-implemented system and a virtual machine image corresponding to said computer-implemented system;

integrate said Universal Resource Address Space and said physical memory address space into a unified local resource directly accessible via said computer-implemented system; and translate a request for access to said virtual address space to a request for access to a memory mapped address, said memory mapped address corresponding to at least one of said physical memory address space and said Universal Resource Addresses Space.

* * * * *